United States Patent [19]

Wakeman et al.

[11] Patent Number: 5,181,379
[45] Date of Patent: Jan. 26, 1993

[54] GAS TURBINE ENGINE MULTI-HOLE FILM COOLED COMBUSTOR LINER AND METHOD OF MANUFACTURE

[75] Inventors: Thomas G. Wakeman, Lawrenceburg; Alan Walker, Wyoming; Harvey M. Maclin, Cincinnati, both of Ohio

[73] Assignee: General Electric Company, Cincinnati, Ohio

[21] Appl. No.: 614,418

[22] Filed: Nov. 15, 1990

[51] Int. Cl.⁵ ............................ F02C 3/00; F23R 3/06
[52] U.S. Cl. ........................................ 60/261; 60/753
[58] Field of Search ................ 60/752, 754, 755, 756, 60/757, 261; 431/352

[56] References Cited

U.S. PATENT DOCUMENTS

| | | | |
|---|---|---|---|
| 2,576,046 | 11/1951 | Scarth | 60/752 |
| 3,527,543 | 9/1970 | Howald | 416/90 |
| 3,623,711 | 11/1971 | Thorstenson | 263/19 A |
| 3,737,152 | 6/1973 | Wilson | 60/757 |
| 4,232,527 | 11/1980 | Reider . | |
| 4,642,993 | 2/1987 | Sweet | 60/752 |
| 4,653,983 | 3/1987 | Vehr | 416/97 R |
| 4,665,597 | 5/1987 | Auxier et al. | 416/97 R |
| 4,695,479 | 9/1987 | Enzaki et al. | 431/352 |
| 4,696,431 | 9/1987 | Buxe | 239/265.15 |
| 4,737,613 | 4/1988 | Frye . | |
| 4,773,593 | 9/1988 | Auxier et al. | 239/127.3 |
| 4,833,881 | 5/1989 | Vdoviak et al. | 60/261 |
| 4,878,283 | 11/1989 | McLean | 29/163.6 |
| 4,896,510 | 1/1990 | Foltz | 60/757 |
| 4,923,371 | 5/1990 | Ben-Amoz | 416/97 R |

FOREIGN PATENT DOCUMENTS

| | | |
|---|---|---|
| 319759 | 6/1989 | European Pat. Off. . |
| 365195 | 4/1990 | European Pat. Off. . |
| 1177410 | 1/1970 | United Kingdom . |
| 1284743 | 8/1972 | United Kingdom . |

OTHER PUBLICATIONS

Multihole Cooling Film Effectiveness and Heat Transfer, by RE Mayle and FJ Camarata–Transactions of the ASME–Nov., 1975.
Alternate Cooling Configuration for Gas Turbine Combustion Systems, by DA Nealy, SB Reider, HC Mongia–Allison Gas Turbine Divn., Prepared for Advisory Group for Aerospace Research & Development 65th Meeting–6–10 May 1985.
NASA-CR-159656-Advanced Low-Emissions Catalytic-Combustor Program–Phase I Final Report by GJ Strugess–Jun. 1981 report.

Primary Examiner—Richard A. Bertsch
Assistant Examiner—Timothy S. Thorpe
Attorney, Agent, or Firm—Jerome C. Squillaro; James P. Davidson

[57] ABSTRACT

A gas turbine engine combustor is provided, having a single wall sheet metal liner which is generally annular in shape which may be corrugated and a multi-hole film cooling means which includes at least one pattern of a great many small closely spaced sharply downstream angled film cooling holes disposed essentially along portion of the liner to be cooled. Another embodiment provided a corrugated aircraft engine afterburner sheet metal liner having at least one pattern of great many small closely spaced sharply downstream angled film cooling holes disposed essentially along the entire surface of the liner.

12 Claims, 4 Drawing Sheets

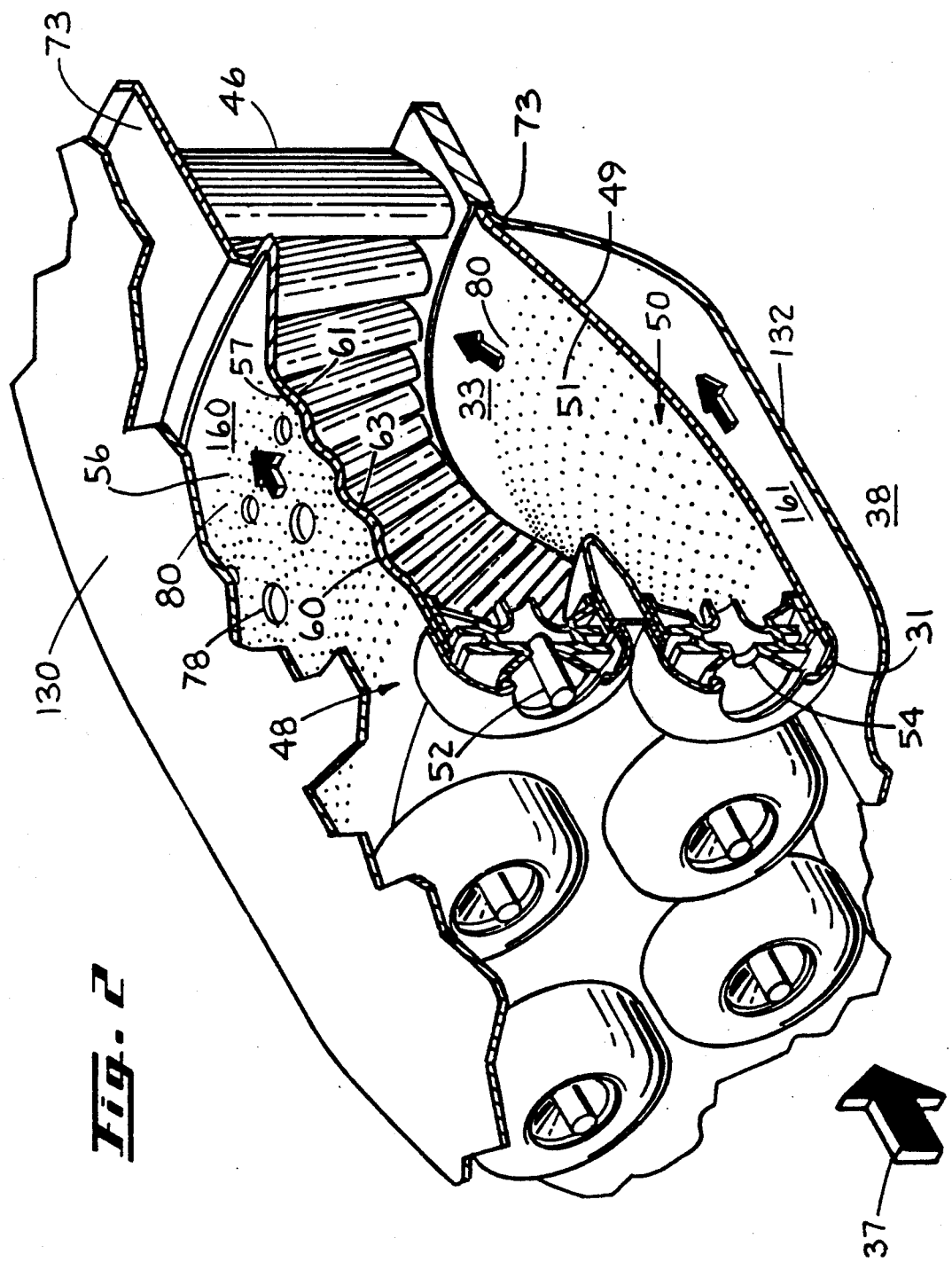

GAS TURBINE ENGINE MULTI-HOLE FILM COOLED COMBUSTOR LINER AND METHOD OF MANUFACTURE

The Government has rights in this invention pursuant to Contract No. F33615-81C-5156 awarded by the Department of the Air Force.

BACKGROUND OF THE INVENTION

1. Field of the Invention

This invention relates to film cooled combustor liners for use in gas turbine engines, and more particularly, to aircraft gas turbine engine multi-hole film cooled combustor liners.

2. Description of Related Art

Combustor liners are generally used in the combustion section of a gas turbine engine which is located between the compressor and turbine sections of the engine. Combustor liners are also used in the exhaust sections of aircraft engines that employ afterburners. Combustors generally include an exterior casing and an interior combustor. Fuel is burned in the interior of the combustor producing a hot gas usually at an intensely high temperature such as 3,000° F. or even higher. To prevent this intense heat from damaging the combustor before it exits to a turbine, a heat shield or combustor liner is provided in the interior of the combustor. This combustor liner thus prevents the intense combustion heat from damaging the combustor or surrounding engine.

Some aircraft gas turbine engines, particularly ones that are capable of supersonic flight such as military fighters and bombers, have afterburners or augmenters located in the exhaust section of the engine. Heat shields or liners are also provided for afterburner engines to prevent the intense combustion heat from damaging the surrounding casing of the exhaust section or other parts of the engine and aircraft.

In the past, various types of combustor and afterburner liners have been suggested and used. In addition, a variety of different methods have been suggested how to cool these liners so as to withstand greater combustion heat or prolong the usable life expectancy of the liner. Characteristically these liners are excessively complex, difficult and expensive to manufacture and overhaul, and increase the weight of the engine. Engine designers have long sought to incorporate low weight liners capable of withstanding the temperatures and pressure differentials found in combustors that are relatively easy and inexpensive to manufacture.

Prior methods for film cooling combustion liners provided circumferentially disposed rows of film cooling slots such as those depicted in U.S. Pat. No. 4,566,280 by Burr and U.S. Pat. No. 4,733,538 by Vdoviak et al. which are typified by complex structures that have non-uniform liner thicknesses which give rise to thermal gradients which cause low cycle fatigue in the liner and therefore shorten their potential life expectancy and reduce their durability. The complex shapes and machining required to produce these liners negatively effects their cost and weight.

Other film cooled combustor liners, such as those depicted in U.S. Pat. No. 4,695,247 by Enzaki et al., have disclosed the use of double wall liners which employ film cooling holes having about 30 degrees incline to the film cooled hot wall. This type of double walled liner is complex, heavy and expensive to manufacture and repair. The interior cavity between the spaced apart double walls can also cause maintenance problems and clogging. Reference is also made to another double wall type liner having multi hole film cooling disclosed in U.S. Pat. No. 4,896,510 by Foltz. Foltz is cited for reference purposes only in order to better understand the present invention and therefore it, as well as all the other patents above, are specifically incorporated herein by reference.

Yet another means to cool liners employs transpiration cooling means wherein cooling air is continuously effused through a liner which can almost be described as porous. Transpiration cooled liners have relatively complicated holes and may employ multiple layers of material. Transpiration cooled liners may be flimsy because of the degree of porosity and, therefore, require complicated or heavy support means in order to be used in modern day large turbine engines.

SUMMARY OF THE INVENTION

The foregoing problems are overcome and other advantages are provided by a single wall annular combustor liner, preferably made of sheet metal, having a multi-hole film cooling means disposed through the wall. Multi-hole film cooling means of the present invention comprises a great many sharply downstream angled small film cooling holes, angled axially downstream, and spaced closely together to form at least one continuous pattern designed to provide film cooling over the length of the liner. Film cooling holes of the present invention should be small enough to promote good film cooling yet large enough to avoid unacceptable levels of hole clogging. Multi-hole film cooling holes of the preferred embodiment have a diameter of about 20 mils with a nominal tolerance of about ±2 mils and we have found that holes of 10 mils are prone to clogging and should be avoided. Further in accordance with the present invention the film cooling holes have a slant angle of 20 degrees with a nominal tolerance of about ±1 degree, are spaced closely together about 6½ to 7½ hole diameters apart, and axially adjacent rows of holes are circumferentially offset by half the angle between circumferentially adjacent holes to further enhance the evenness of the cooling film injection points.

In accordance with the preferred embodiment of the present invention, the combustor liner may be corrugated so as to form a wavy wall which is designed to prevent buckling and is particularly useful for outer burner liners in the combustion section of gas turbine engines and exhaust duct burner liners in aircraft gas turbine engines having afterburners.

The present invention provides a low cost manufacturing method for making multi-hole film cooling combustor liners wherein the liner is rolled to an annular shape from thin sheet metal (in the range of about 30-80 mils thick, 80 mils for an outer liner and 30 mils for an inner liner as shown in the figures) the axially extending edges are welded together to form a single wall annular shell, then the holes are laser drilled from in a specified pattern by computer controlled laser drilling devices so as to form at least one continuous pattern of small (on the order of 20 mil) multi-hole film cooling holes in the shell. The holes have sharp downstream angles which may be in the range of 20° to 10°, preferably 20°, with a tolerance of about ±1°, and spaced relatively closely together (about 140 mils between center-lines). The final shape of the liner, which may include shallow wavy wall corrugations and flanges, is expansion formed by well known conventional techniques using expansion dies. Dilution holes may be drilled in the liner either before or after the final annular shape is formed and thermal barrier coatings may also be applied before or after the cooling holes are drilled and the final shape is formed.

ADVANTAGES

Combustor liners made in accordance with the present invention dramatically reduces the radial temperature gradients typically found in conventional nugget or panel film cooled combustor liners. Reduction of these radial gradients result in a consequent reduction in thermal hoop stress and improved Low Cycle Fatigue life. The use of a simple wave form, as found in conventional augmenter liners, may be used in the outer liner of the combustion section of the engine, as well as the augmenter liner, to provide a low cost means of imparting buckling resistance to the combustor liner.

The present invention also provides a very simple low cost method of manufacture whereby a sheet metal cylinder is Laser drilled to provide the cooling pattern and the stiffening wave form is imparted into the shell by means of expansion dies.

Another advantage provided by the present invention is that, with the wave form design, dilution holes can be positioned anywhere on the panel, unlike conventional liners where dilution holes are restricted to positioning between panel nuggets.

BRIEF DESCRIPTION OF THE DRAWINGS

The foregoing aspects and other features of the invention are explained in the following description, taken in connection with the accompanying drawings where:

FIG. 2 is a perspective view of the core engine combustion section of the engine depicted in FIG. 1.

DETAILED DESCRIPTION OF THE INVENTION

Figure 1:
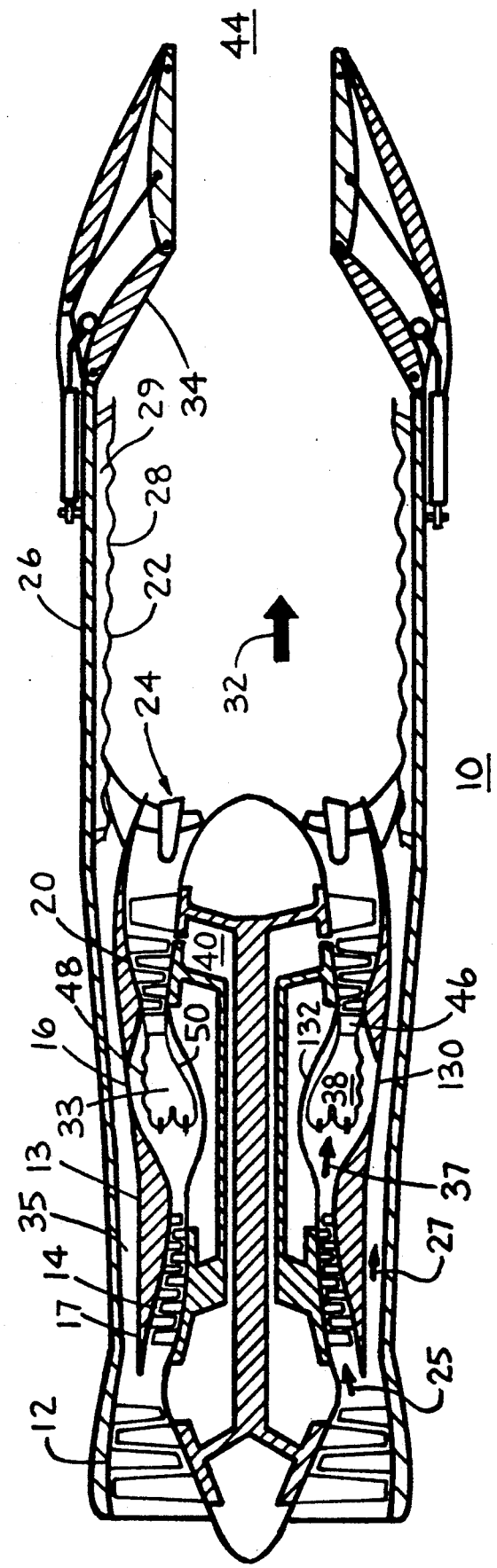
FIG. 1 is a diagrammatic view of a typical gas turbine engine including a core engine combustion section and an afterburning exhaust section having combustor liners in accordance with the present invention.

The gas turbine engine of FIG. 1 is representative of an aircraft gas turbine engine having a combustion section and afterburner incorporating combustion liners in accordance with the present invention.

Referring to FIG. 1, a typical gas turbine engine 10 is shown comprising a fan section 12 which is in serial flow relationship with an engine core 13 and with a by-pass duct 35 which is generally disposed, in concentric fashion, about the engine core. Flow from engine core 13 and by-pass duct 35 is discharged to an exhaust section 22 having a nozzle 34 used to help produce thrust. A splitter 17 by-passes a portion of the air flow 27, referred to as by-pass flow, from the fan section 12 through by-pass duct 35 around engine core 13. The remaining airflow, referred to as core air flow 25, is compressed by compressor 14 and discharged to a combustion section 16 which includes axially and circumferentially extending outer and inner combustor liners 48 and 50, respectively. Outer and inner combustor liners 48 and 50 are radially spaced from each other to define a portion of annular combustion flow path or combustion zone 33 therebetween where a portion of core flow 25 is mixed with fuel and the resultant mixture is combusted. The combustion section produces hot combustion gases which are mixed with the remainder of the compressor discharge flow and the resultant heated effluent is then flowed to the turbine section 20 which powers the compressor section 14 and the fan section 12.

An afterburner 24, as illustrated in FIG. 1, is disposed in exhaust section 22 downstream of turbine section 20 and is operable for burning additional fuel with bypass air 27 and core flow 25 in order to augment or produce additional thrust. Thrust augmentation is particularly useful in military aircraft for short periods of time such as during takeoff, climb and during combat maneuvers. The exhaust section 22 contains gas flow 32 which is circumscribed by an annular case 26 and an annular afterburner liner 28 radially inward of casing 26, and a cooling plenum 29 therebetween. The afterburner may also be referred to as an augmenter.

Outer and inner combustor liners 48 and 50 and afterburner liner 28 provide some generally similar functions. They contain the hot combustion gases and provide a flowpath suitable to promote efficient combustion. Pressurized air enters combustion section 16 where it is mixed with fuel and burned. The hot gases of combustion, which may in some gas turbine engines exceed 3000° F. exit combustion section 16, flow thereafter past turbine blades 46 and through the remaining portion of turbine section 20. The hot gases are then expelled at a high velocity from engine 10 through exhaust nozzle 34, whereby the energy remaining therein provides thrust generation by engine 10.

Referring now to FIG. 2, a perspective view of the combustion section 16 is depicted comprising a combustor assembly 38 positioned in the compressor discharge flow 37 between an outer combustor casing 130 and an inner combustor casing 132 in energized fluid supply communication with turbine section 20 denoted by turbine blades 46. Combustor assembly 3 is further comprised of axially and circumferentially extending outer and inner combustor liners 48 and 50, respectively, radially spaced from each other to define a portion of annular flow path or combustion zone 33 therebetween. Outer liner 48 and outer casing 130 form an outer combustor passage 160 therebetween and inner liner 50 and inner casing 132 form an inner passage 161 wherein said passages provide for receiving cool compressor discharge air. Disposed at the upstream end of combustor liners 48 and 50 is a plurality of fuel injectors 52 mounted within a plurality of apertures 54 in the combustor dome 31 of combustor assembly 38. Note, that combustor assembly 38 and outer and inner combustor liners 48 and 50 have a preferred annular configuration, extending circumferentially about the center-line of the engine and dome 31 is of the double dome type to accommodate the double annular ring of fuel injectors 52. Accordingly, fuel injectors 52 are circumferentially spaced from each other to provide a number of injection points for admitting a fuel/air mixture to combustor assembly 38 over the circumferential extent of annular combustion flow path 33.

The upstream ends of combustor liners 48 and 50 are formed with means to be attached to and axially and radially supported by combustor dome 31. Downstream ends 73 have radial support means such as interference fits or other conventional support means which provides radial support and allows for thermal growth of liners 48 and 50.

Outer liner 48 is preferably comprised of a single wall annular sheet or shell having a generally axially extending generally annular corrugations 60 which provides Outer liner 48 with a wavy wall 63 cross-section. Outer liner 48 has a cold side 57 in contact with the relatively cool air outside the combustion zone 33 and a hot side 61 facing the combustion zone and includes a means for providing multi-hole film cooling of liner 48. The means for providing multi-hole film cooling, shown in greater detail in FIG. 4, comprises a plurality of very narrow closely spaced film cooling holes 80 disposed through liner 48 at a sharp downstream angle A in a range from 15° to 20° and which are axially rearward slanted from cold surface 57 to hot surface 61 of liner 48. We have found that from a manufacturing and cost standpoint a slant angle A of about 20° is preferred with respect to either surface of liner 48. Smaller slant angles A may be may be advantageous for improved cooling and therefore an alternative slant angle A in the range of about 20° to 15° may be used if the associated costs are warranted. Slant holes smaller than 15 degrees may weaken the liner structure. The holes have a preferred diameter of 20 mils (0.02 inches) and are preferably spaced about 150 mils (0.15 inches) off center from each other or about six and one half (6½) hole diameters.

Similarly inner liner 50 is formed of a single wall annular sheet or shell having a plurality of very narrow closely spaced sharply slanted film cooling holes 80 which are axially rearward slanted from cold surface 49 to hot surface 51 of liner 50.

Figure 3C:
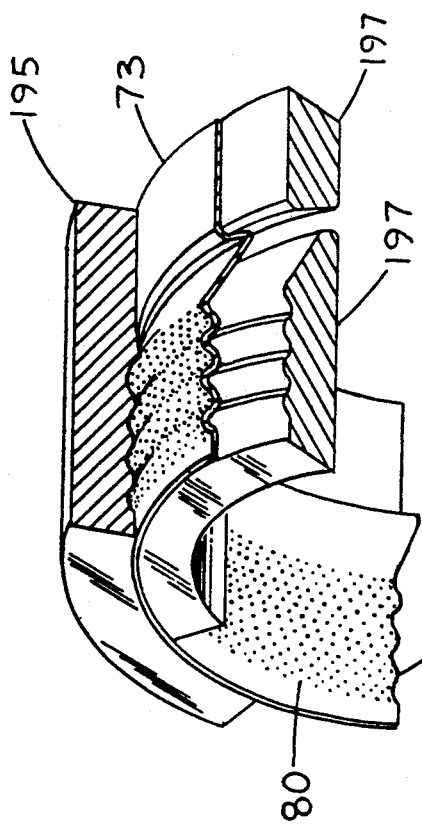
FIGS. 3a-3d illustrate a method of manufacturing a combustion section combustor liner such as the main combustor liner depicted in FIG. 1, in accordance with the preferred embodiment of the present invention.
Figure 3D:
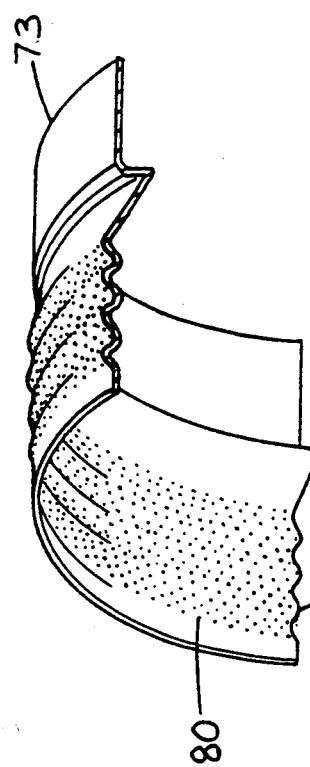
Figure 3A:
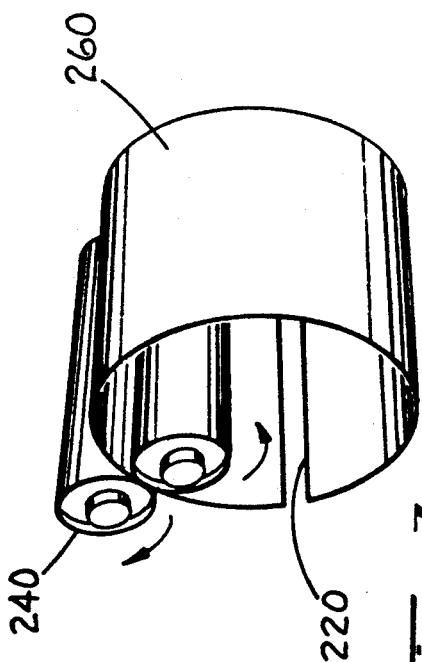
Figure 3B:
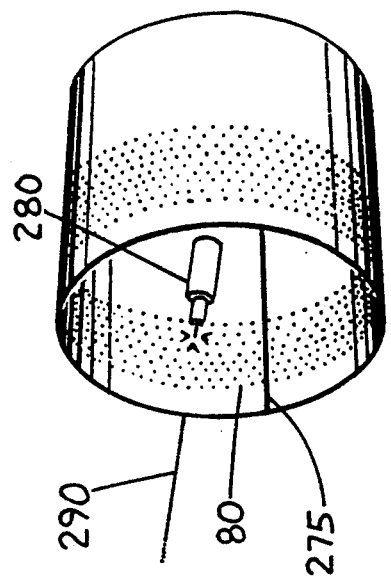
Figure 5:
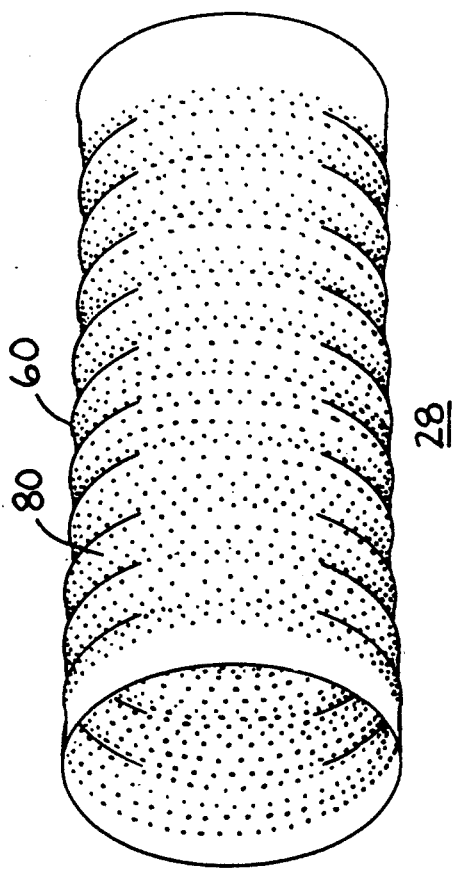
FIG. 5 is a perspective view of the afterburner liner depicted in FIG. 1.

The single wall annular combustor liner is an important aspect of the present invention as is its method of manufacture. The preferred method of manufacturing a typical combustor liner in accordance with the present invention is depicted in FIGS. 3a through 3d. An outer combustor liner 48 is formed of thin sheet metal, suitable for the hot environment of a gas turbine combustor, having a thickness, in the preferred embodiment, of about 80 mils (0.08 inches). The sheet metal shell 48 is formed from a sheet of sheet metal 260, preferably by rolling, as illustrated in FIG. 3a by rollers 240, and its axially extending edges 220 welded together to produce a seam 275 thereby forming the shell's generally annular shape which may be either conical or cylindrical. As depicted in FIG. 3b, multi-hole film cooling holes 80 are then laser drilled, as illustrated by laser 280 and its beam 290, into annular shell of outer liner 48 from the hot side to the cold side of the liner which in the case of outer liner 48 is from the inside of the shell. If, as in the case of outer liner 48 and afterburner liner 28 (shown in FIG. 5), corrugations or waves 60 are to be used, then the corrugations are formed in the shell's wall by expansion using expansion dies, as illustrated in FIG. 3c. Annular cross sections at the ends of the shell may also be formed with this process to form flanges or other mounting means for the liner.

Dilution air is primarily introduced by a plurality of circumferentially extending spaced apart dilution apertures 78 disposed in each of inner and outer liners 48 and 50. Each aperture 78 and has a cross-sectional area substantially greater than the cross-sectional area of one of the multi-hole cooling holes 80 and are generally far smaller in number. Dilution apertures 78 and to a smaller extent cooling holes 80 serve to admit additional air into combustor assembly 38. This additional air mixes with the air/fuel mixture from injectors 52 and, to some extent, will promote some additional combustion.

Figure 4:
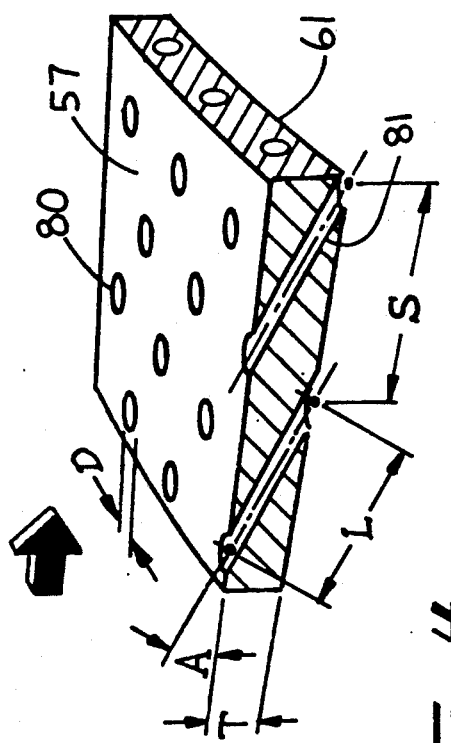
FIG. 4 is an enlarged perspective view of a portion of a combustor liner in accordance with the preferred embodiment of the present invention.

Referring to FIG. 4, liner thickness T, multi-hole film cooling hole spacing S (the distance between cooling hole center-lines), film cooling hole length L and diameter D, and cooling hole angle A of cooling holes 80 are a function of the cooling flow requirements to meet the durability characteristics of the particular engine in which it is used. Preferably, the combustor liners have a thermal barrier coating on their hot side 61 to further reduce the heat load into the liners. Cooling holes 80 are laser drilled holes. Typically combustor liner wall thickness T is sized to meet both mechanical loading requirements and to allow the cooling flow through cooling hole 80 to develop an adequate length to diameter ratio (L/D) of least 1.0 and preferably longer. This minimum L/D is required to form a good film and to maximize convective cooling along an internal cooling hole surface 81 within cooling hole 80. We have also found that the cooling holes should be spaced about 7 diameters apart from each other or between center-lines C of adjacent cooling holes 80.

The process of laser drilling is preferably done by drilling the holes from hot side 61 to cold side 57 of the combustor liner, which for outer liner 48 and afterburner liner 28 is from the inside of the shell out, thereby producing a diffusion cooling hole having a flared outlet which is wider than the cooling hole inlet. The flared outlet provides diffusion of the cooling flow through cooling hole 80 thereby enhancing the film cooling effectiveness which reduces the amount of cooling flow needed through cooling holes 80 and the pressure and engine performance losses associated with such cooling means.

It may be preferable, particularly in the case of outer liners 48 and afterburner liners 28, to provide a buckling resistance means such as corrugations 60 shown in FIGS. 1 and 2. Buckling of outer 48 liner due to inward pressure load is a primary design consideration. Small and medium diameter short length combustors may only require a reasonable liner thickness combined with its formed shape and end support provided by combustor dome 31 and stator seal to provide sufficient buckling margin. This margin can be increased by using significant axial curvature in the liner to increase its section modulus. Very large combustor liners, having about a 30 inch diameter or larger, such as outer liner 48 in combustion section 16 and long combustor liners such as afterburner liner 28 may require additional features to prevent buckling. The present invention provides corrugations 60 of outer liner 48 and afterburner liner 28 to restrict the liner deflection and resist buckling.

The buckling resistance imparted by the wave design of corrugations 60 is similar to that applied in augmenter liners and must be designed to provide that the film effectiveness of the liner is not adversely affected by the wave form. We have found that a shallow sine wave form is preferred. An example of such a shallow wavy wall or corrugated liner is illustrated in the preferred embodiment which provides, for a combustor section outer liner 48 having a 30 inch diameter, a trough to crest depth along hot surface 51 of about 80 mils 0.08 inches) and a crest to crest length of about 900 mils 0.9 inches) We have found that such a configuration is very effective for maintaining the integrity of the cooling film and providing sufficient buckling resistance.

Sheet metal materials suitable for combustors are well known and include such alloys as Hastelloy X, HS188 and HA230. Also suitable for use is Rene' 80 when used in conjunction with the Rapid Solidification Plasma Deposition (RSPD) process which may not be suitable for sheet metal liners but which may be economically formed to its annular shape on a mandrel. The liner itself when using sheet metal materials can be formed by either rolling or spinning the sheet to the proper sizes or by welding sheet, followed by spinning to the desired geometry. This liner configuration will be of lower cost because manufacturing consists primarily of spun sheet metal, laser drilled and coated with thermal barrier protection.

The method of manufacturing combustor liners in accordance with the preferred embodiment of the present invention provides a very cost effective combustor liner. Referring to FIGS. 3A-3C, a cylinder is first produced from sheet metal stock, preferably by rolling and made of one of the materials listed above. A single axial weld is made along the axially extending ends of the rolled sheet metal to join the cylinder ends together. The cylinder is then fixtured and multi-hole film cooling holes 80 are laser drilled in the cylinder. An outer liner 48 for a combustion section 16 having a typical diameter of 30 inches may typically contain over 20,000 holes. The drilled combustor liner is then expanded on a set of dies which impart the wave form.

A laser drilling step contemplated by the present invention is aptly referred to as "on the fly" laser drilling where a number of successive drilling passes for each hole are made as the liner shell rotates in the circumferential direction. It is contemplated that in order to drill the shallow angled film cooling hole at its preferred slant angle of 20°, about 6 to 10 successive laser pulses (percussion) are required per hole. This method further provides that the shell rotates so that the circumferential holes in each axial position are drilled sequentially. Since, by using this method, the shell makes 6-10 revolutions before the holes are finished there is cooling between successive pulses thereby yielding a better hole with less recast layer and significantly reducing out of roundness or the liner due to thermal distortion.

Presently it is contemplated that ten pulses per hole is preferred on the basis of hole quality and cost (including laser drilling equipment wear-out). The preferred number of pulses generally allows for the hole to be made through the material in 6 pulses, and the following four pulses are used to essentially ream the hole to size. It is estimated that for a thirty inch diameter 80 mil thick liner, 6-16 seconds per hole and 30-40 hours per liner is required for production for a combustion section combustor liner. Obviously these parameters will vary according to the specific requirements of a given combustor liner design and are offered for illustrative purposes only. The preferred tolerance of the film cooling holes' diameter is ±2 mil and the preferred tolerance of the cooling hole's slant angle A is ±1 degree.

Recognizing that laser drilling may cause excessive formation of brittle recast material around the hole and microcracks in the hole as it's made it may be useful to incorporate the following additional steps. After laser drilling use air water assisted grit blast (AWAG) process to remove edge recast along with some of the in-bore recast layer. Experiments show AWAG on the hole axis is better than AWAG shot normal to the surface. A side effect problem with AWAG is that hole flow increased and varied considerably (about 7% to 24%) and therefore use of AWAG may require laser drilling smaller film cooling holes i.e., 18 mils or so for a final 20 mil hole.

While the preferred embodiment of our invention has been described fully in order to explain its principles, it is understood that various modifications or alterations may be made to the preferred embodiment without departing from the scope of the invention as set forth in the appended claims.

We claim:

1. A gas turbine combustor liner comprising:
    a single wall shell having a hot side and a cold side and at least one continuous pattern of small closely spaced sharply downstream angled, from said cold side to said hot side, film cooling holes,
    said continuous pattern extending essentially over the entire length of said shell,
    said film cooling holes having a hole diameter, a downstream slant angle, and spaced at least sufficiently close enough together to effect a continuous cooling film on said hot side of said shell liner during combustor operation,
    said film cooling holes operable to inject all of the cooling air at essentially said slant angle, and
    at least a portion of said shell is corrugated to form a shallow wavy wall cross-section.

2. A gas turbine combustor liner as claimed in claim 1 wherein said downstream slant angle is about twenty degrees.

3. A gas turbine combustor liner as claimed in claim 1 wherein said downstream slant angle is about fifteen degrees.

4. A gas turbine combustor liner as claimed in claim 1 wherein said downstream slant angle is in a range of about between ten and twenty degrees.

5. An afterburning gas turbine engine exhaust section combustor liner comprising:
    a single wall sheet metal shell having a hot side and a cold side and having a portion of said shell corrugated to form a shallow wavy wall cross-section and
    at least one continuous pattern of small closely spaced sharply downstream angled, from said cold side to said side, film cooling holes disposed through said shell,
    said continuous pattern extending essentially over the entire length of said shell,
    said film cooling holes having a hole diameter, a slant angle, and spaced at least sufficiently close enough together to effect a continuous cooling film on said hot side of said shell during combustor operation, and
    said film cooling holes operable to inject all of the cooling air at essentially said slant angle.

6. An afterburning gas turbine engine exhaust section combustor liner as claimed in claim 5 wherein said slant angle is about twenty degrees.

7. An afterburning gas turbine engine exhaust section combustor liner as claimed in claim 5 wherein said slant angle is about fifteen degrees.

8. An afterburning gas turbine engine exhaust section combustor liner as claimed in claim 5 wherein said downstream slant angle is in a range of about between ten and twenty degrees.

9. A gas turbine combustion section comprising:

an outer casing, a single wall sheet metal outer liner disposed inward of said outer casing and having at least one continuous pattern of small closely spaced sharply downstream angled film cooling holes spaced at least sufficiently close enough together to effect a cooling film on an outer liner hot side of said outer liner during combustion section operation, a single wall sheet metal inner liner disposed inward of said outer liner and having at least one continuous pattern of small closely spaced sharply downstream angled film cooling holes, said film cooling holes having a hole diameter, a downstream slant angle, and spaced at least sufficiently close enough together to effect a continuous cooling film on an inner hot side of said inner liner during combustion section operation, said continuous pattern extending essentially over the entire length of said liners, said film cooling holes operable to inject all of the cooling air at essentially said slant angle, and at least a portion of said outer liner is corrugated to form a shallow wavy wall cross-section.

10. A gas turbine combustion section as claimed in claim 9 wherein said downstream slant angle is about twenty degrees.

11. A gas turbine combustion section as claimed in claim 10 wherein said downstream slant angle is about fifteen degrees.

12. A gas turbine combustion section as claimed in claim 10 wherein said downstream slant angle is in a range of about between ten and twenty degrees.

* * * * *